United States Patent [19]
Lapeyre

[11] Patent Number: 4,925,013
[45] Date of Patent: * May 15, 1990

[54] CONVEYOR BELT HAVING A HIGH FRICTION CONVEYING SURFACE

[75] Inventor: James M. Lapeyre, New Orleans, La.

[73] Assignee: The Laitram Corporation, Harahan, La.

[ * ] Notice: The portion of the term of this patent subsequent to May 23, 2006 has been disclaimed.

[21] Appl. No.: 241,789

[22] Filed: Sep. 6, 1988

Related U.S. Application Data

[63] Continuation of Ser. No. 4,789, Jan. 8, 1987, abandoned, which is a continuation of Ser. No. 642,533, Aug. 20, 1984, abandoned.

[51] Int. Cl.$^5$ ............................................. B65G 15/42
[52] U.S. Cl. .................... 198/698; 198/690.2; 198/699.1; 198/853
[58] Field of Search ............... 198/688.1, 690.2, 698, 198/699, 699.1, 731, 803.01, 853

[56] References Cited

U.S. PATENT DOCUMENTS

| | | | |
|---|---|---|---|
| 3,870,141 | 3/1975 | Lapeyre et al. | 198/853 |
| 4,080,842 | 3/1978 | Lapeyre et al. | 198/853 X |
| 4,213,527 | 7/1980 | Lapeyre et al. | 198/853 |
| 4,351,429 | 9/1982 | Garvey | 198/688 |

FOREIGN PATENT DOCUMENTS 2714273 2/1978 Fed. Rep. of Germany ...... 198/648

Primary Examiner—Robert J. Spar
Assistant Examiner—Lyle Kimms
Attorney, Agent, or Firm—James C. Kesterson

[57] ABSTRACT

A module for forming a conveyor belt (22) having a high friction conveying surface and which is comprised of a plurality of identical modules (36, 38, 40, 42 and 44) preferably formed by injection molding is disclosed. Each module (36) has a top portion and bottom portion, and includes a plurality of elongated elements each of which has first pivot ends (36A) and second pivot ends (36B) formed integral with an intermediate section (54). Each of the plurality of pivot ends define pivot holes (62) which have axes (64 and 66) aligned such that the pivot ends of other modules may be pivotally connected by a pivot rod (46 and 50). Modules of a conveying belt include a device for receiving a driving force which is applied to the module orthogonally to the pivot axis and substantially parallel to a first plane defined by the first and second axis (64 and 66). The top side of each module defines an area (74) for attaching a frictional member (72) and the frictional member (72) has a bottom side or attaching portion (80) which cooperates with the area (74) on the top side of the module. Each frictional member further has a top side (78) which forms the conveying surface of the conveying belt (22) such that the conveying belt (22) will exhibit increased friction characteristics and thereby reduce slippage between the conveying belt (22) comprised of the modules and items (28 and 30) conveyed by the belt.

25 Claims, 4 Drawing Sheets

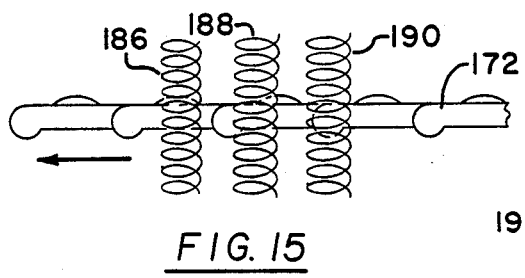
FIG. 15
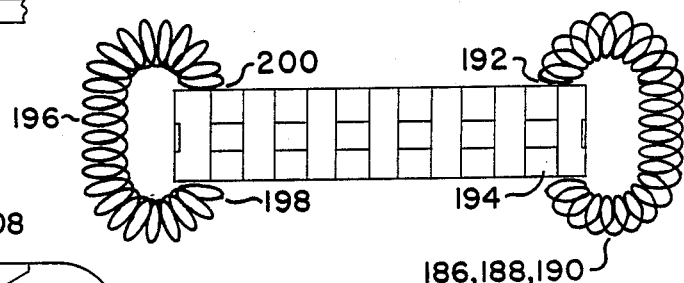
FIG. 16
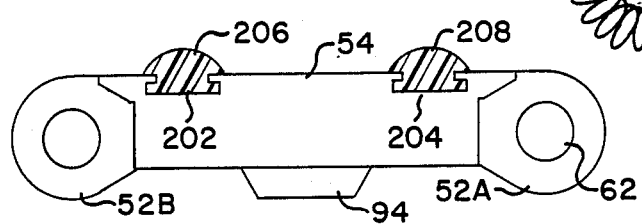
FIG. 17
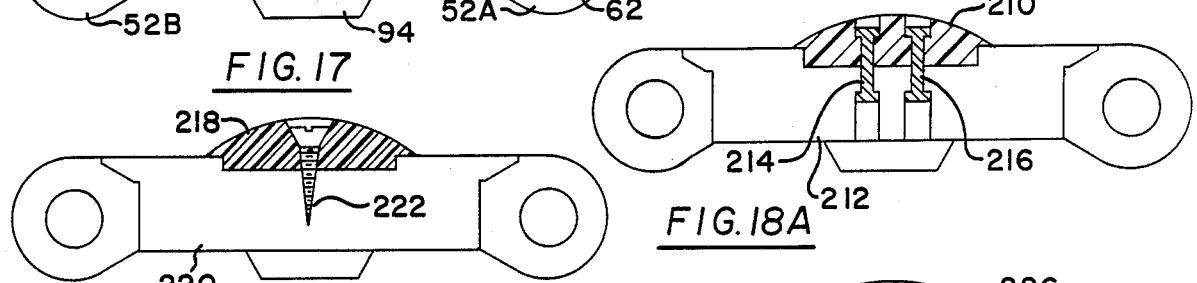
FIG. 18A
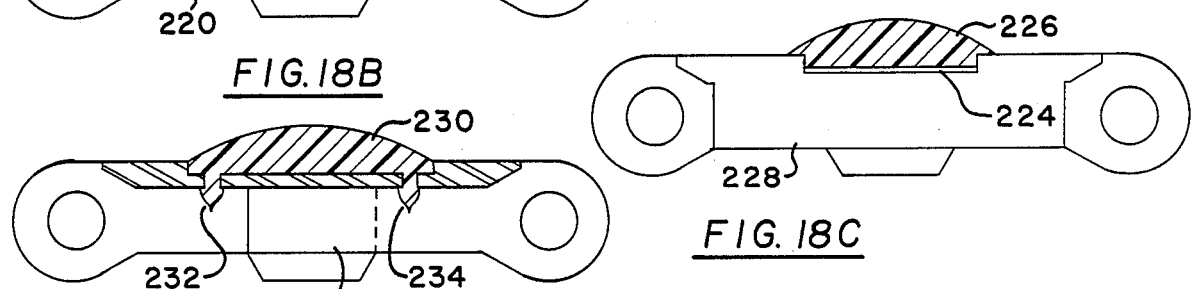
FIG. 18B
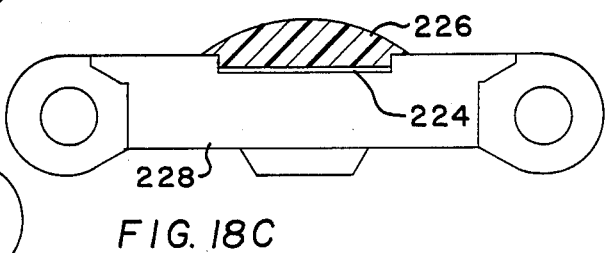
FIG. 18C
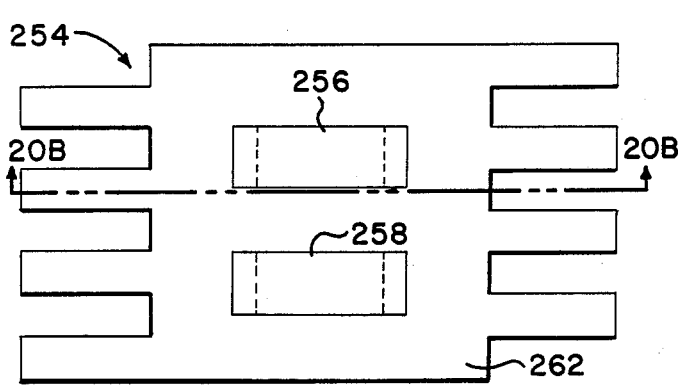
FIG. 18D
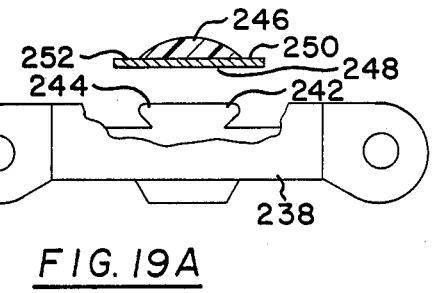
FIG. 19A
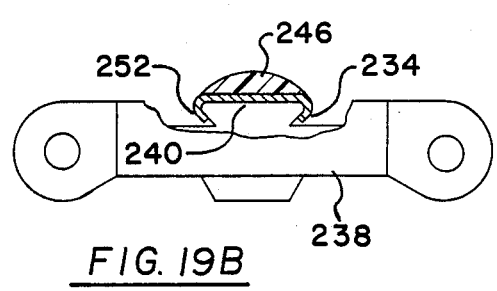
FIG. 19B
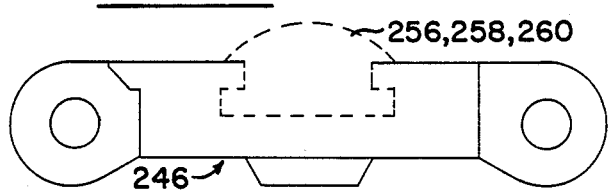
FIG. 20A
FIG. 20B

CONVEYOR BELT HAVING A HIGH FRICTION CONVEYING SURFACE

This application is a continuation of application Ser. No. 4,789, filed Jan. 8, 1987, now abandoned, which is a continuation of application Ser. No. 642,533, filed Aug. 20, 1984, now abandoned.

TECHNICAL FIELD

This invention relates to a conveyor belt having selected areas of high surface friction and more particularly to such a conveyor belt which includes a plurality of individual modules joined together by pivot rods. The modules are of a type preferably formed by injection molding and which include a first and second plurality of pivot ends which are intermeshed with pivot ends of other modules by means of pivot rods. The particular belt of this invention, can be driven by any known means, including means for driving the belt at the center of the pitch line of each module or means for driving the belt at the pivot end of each module. In addition, the belt could also be driven by operating as the armature of a linear motor or alternately could be driven by any other known method. However, regardless of the method of driving a belt formed by such modules, the present invention includes the use of a frictional member typically formed of a resilient material such as rubber which is attached to the top surface of at least a portion of the modules so that the attached frictional member reduces the slippage between a conveyor belt and items being conveyed by the conveying belt. A low friction is maintained on the bottom of the belt which is normally contacting the conveyor frame in a sliding manner.

BACKGROUND

A typical modular conveyor belt is disclosed in U.S. Pat. No. 3,870,141 issued to J. M. Lapeyre on Mar. 11, 1975. According to this patent, identical modules formed by injection molding, are pivotally connected to one another to form a conveyor belt of a desired length. Each module includes a plurality of elongated elements, each of which has a first pivot end and a second pivot end. The plurality of elongated elements are connected together such that apertures defined in each of the first and second pivot ends lie along a first and second pivot axis respectively, which pivot axis are parallel one to the other. The link ends of one module are intermeshed and pivotally connected by means of a pivot rod to the link ends of another module until an entire belt having a desired length and width is formed. However, although the plastic belt built according to the teachings of this patent, has been well received by industry and has many particular uses, it is injected molded out of plastic, and consequently its top surface is typically smooth or somewhat slick. Therefore, it is not particularly efficient at transmitting smooth surfaced packages such as cardboard boxes and the like up and/or down an incline.

U.S. Pat. No. 4,171,045 issued on Oct. 16, 1979 also to Lapeyre, recognized the need for including a conveying surface which would not allow objects riding on the conveying surface to slip and thereby allow the belt to pass underneath. The belt disclosed and formed by the teachings of the U.S. Pat. No. 4,171,045, is similar to that of the U.S. Pat. No. 3,870,141 discussed heretofore except that selected ones of the elongated members include a plurality of "dogs" which extend above the normal portion of the conveying surface to contact and push articles on the conveying surface along such that the belt will not slip underneath.

In a similar manner, U.S. Pat. No. 4,213,527 issued June 22, 1980 to J. M. Lapeyre, et al further discloses a module for forming a link conveyor belt which has ridges or flight members extending transverse to the direction of travel for preventing the conveyor belt from slipping under articles riding on the conveyor belt surface. Similarly, U.S. Pat. No. 4,170,281 issued on Oct. 9, 1979 and U.S. Pat. No. 4,080,842 issued on Mar. 28, 1978, both to Lapeyre, also show conveying belts having members extending transverse to the conveying surface for moving articles on the conveying surface along the belt such that the belt cannot slip underneath the article. U.S. Pat. No. 4,084,687 issued to Lapeyre discloses a conveyor belt patent not particularly relevant to the present invention except that the top surface is resilient or flexible. However, although resilient, the surface would typically be very slick.

Still other modular link conveyor belt patent applications by Lapeyre and/or owned by the same assignee as the present invention which might be considered relevant to the present invention include: Ser. No. 483,210 entitled "Link Chain Belt" filed Apr. 14, 1983; Ser. No. 179,523 entitled "Modular Center Drive Conveyor Belt" filed Aug. 19, 1980; and Ser. No. 457,482 entitled "Lightweight Modular Conveyor Belt" filed Jan. 12, 1983. In addition, two patent applications entitled "Conveyor Belt Having Insertable And Selectable Conveying Members" and "End To End Molded Conveyor Belt Module" filed concurrent with the present application discloses subject matter having some similarity to the present invention.

Thus, a review of the prior art patents as well as pending applications of the assignee of the present invention, reveals that to date there has not been a simple and inexpensive modular conveying belt particularly designed and formed for the purpose of providing a high friction conveying surface such that bulky or smooth surface packages and other items might be conveyed either up and/or down an inclined surface. Therefore, it is an object of this invention to provide a module for forming a conveyor belt which will reduce slippage between such a conveyor belt and items conveyed by the belt.

It is another object of the present invention to provide a simple and inexpensive module formed by injection molding to which can readily be attached a high friction frictional member.

It is also an object of the present invention to provide a module for forming a conveyor belt with a high friction conveying surface, which is modular and has inherent capability for being readily built to custom widths and lengths as well as being repaired and replaced.

It is yet another object of the present invention to provide modules for forming a non-slip conveyor belt, which modules are not dependent upon the type of belt drive and may be incorporated with all present and existing drives.

DISCLOSURE OF THE INVENTION

Other objects and advantages will be obvious, and will in part appear hereinafter and will be accomplished by the present invention which provides a module for forming a conveyor belt having a high friction conveying surface which is formed of a plurality of modules which are pivotally connected. The modules are preferably formed by an injection molding process from an inherently slick or low friction material such as polypropylene. Each module has a top portion and a bottom portion, and includes a plurality of elongated elements each of which has a first pivot end and a second pivot end joined by an intermediate section. Each of the first and second pivot ends define a pivot axis, and the plurality of elongated elements of each module are connected such that all of the pivot axes defined by all of the first pivot ends are coaxial, thereby resulting in a first single pivot axis. Similarly, all of the pivot axes defined by all of the second pivot ends are also coaxial and result in a second single axis parallel to the first pivot axis defined by the first pivot ends. The length of each module is determined by the length of the elongated link elements, and the width of the module is determined by the number of link elements connected together. Since the resulting pivot axes of the first and second pluralities of link ends are parallel, these axes lie in a common first plane. The thickness of each of the pivot ends is less than the spacing between the adjacent pivot ends so that the pivot ends of one module may be intermeshed and connected with the pivot ends of another module by means of a pivot rod when the pivot ends of the two modules are aligned coaxially. Selected ones of the modules (usually all) also include a means for receiving a driving force which is applied orthogonal the pivot axis and substantially parallel to the common first plane for purposes of moving such modules. Consequently a belt, formed of the plurality of modules will be moved in a direction perpendicular to the parallel pivot axis. For example in one embodiment, such a means for receiving the driving force may comprise a tooth formed integrally or connected to the intermediate section of each module which cooperates with a recess formed in a sprocket drive wheel. Alternately, a module may define a recess which cooperates with a tooth on the sprocket wheel.

In addition, selected ones (usually all) of the modules comprising the belt define a necessary area on the top portion for attaching a frictional member. The frictional members includes an exposed surface which exhibits increased friction characteristics and also includes an appropriately shaped portion which cooperates with the receptive area of the module such that the frictional member may be secured to the top portion of the module by suitable means which may include locking receptacles, adhesives, rivets, screws or the like. However, according to a preferred embodiment, the top portion of the module includes a recess for receiving the frictional member and the module further includes an overhang member such as a tab, ledge, or other suitable locking means for restraining the frictional member in the recess.

BRIEF DESCRIPTION OF THE DRAWINGS

The above features of the present invention will be more clearly understood from consideration of the following description in connection with the accompanying drawings in which:

FIGS. 15 and 16 respectively show a side and end view of the belt of FIG. 14 with the stator coils in place.

FIG. 17 illustrates a conveying link module similar to FIG. 1, except two conveying flight members are attached to each module.

FIGS. 18A, 18B, 18C and 18D show still other alternate methods of attaching the resilient frictional member to the top portion of the module.

FIGS. 19A and 19B shows yet another method of attaching the resilient frictional member to the module.

FIGS. 20A and 20B show top and side views respectively of the use of a multiplicity of smaller resilient inserts attached to each of the modules.

BEST MODE FOR CARRYING OUT THE INVENTION

Figure 1:
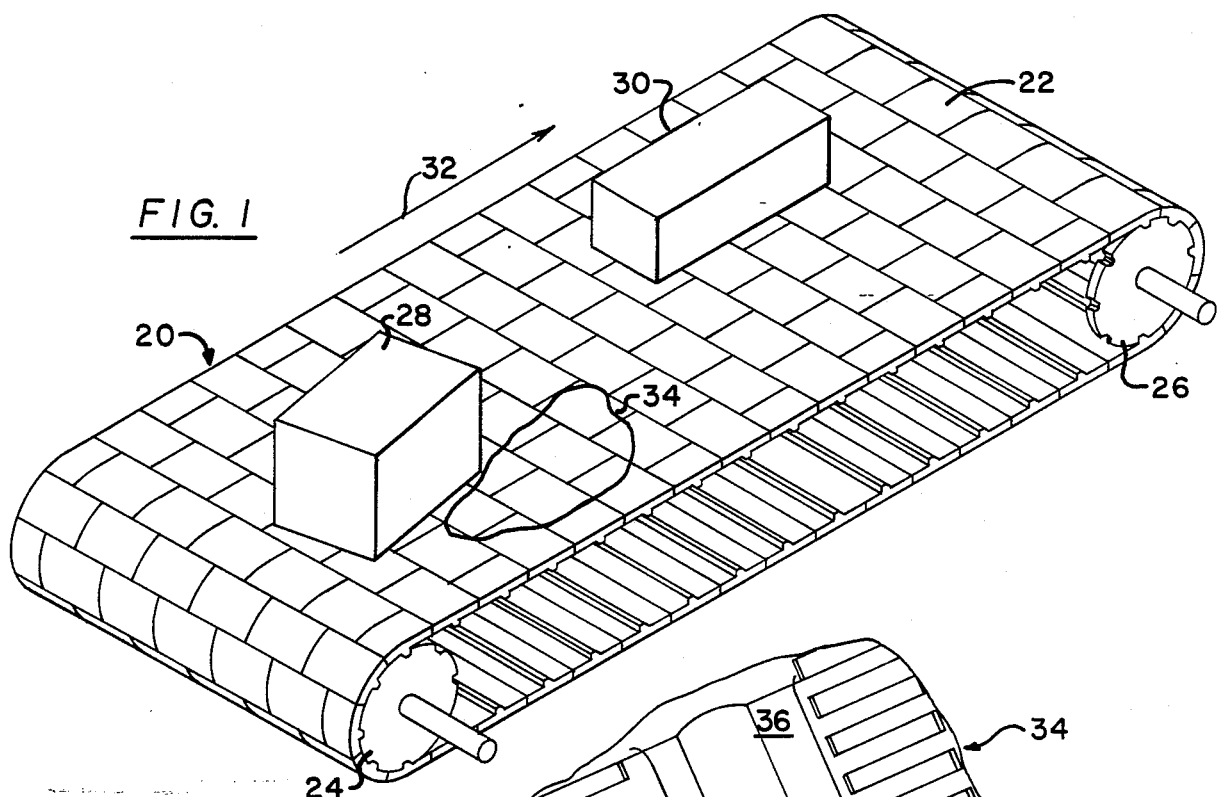
FIG. 1 shows a conveyor belt which includes modules of this invention carrying bulky packages up an inclined plane.

Referring now to FIG. 1, there is shown generally at 20 an endless loop conveyor belt 22 having a lower sprocket 24 and an upper sprocket 26. As will be appreciated by those skilled in the art, either lower sprocket 24 or upper sprocket 26 may be used to provide a driving force to belt 22. Further, as can be seen belt 22 is moving bulky packages 28 and 30 up an inclined plane as indicated by an arrow 32.

Figure 2:
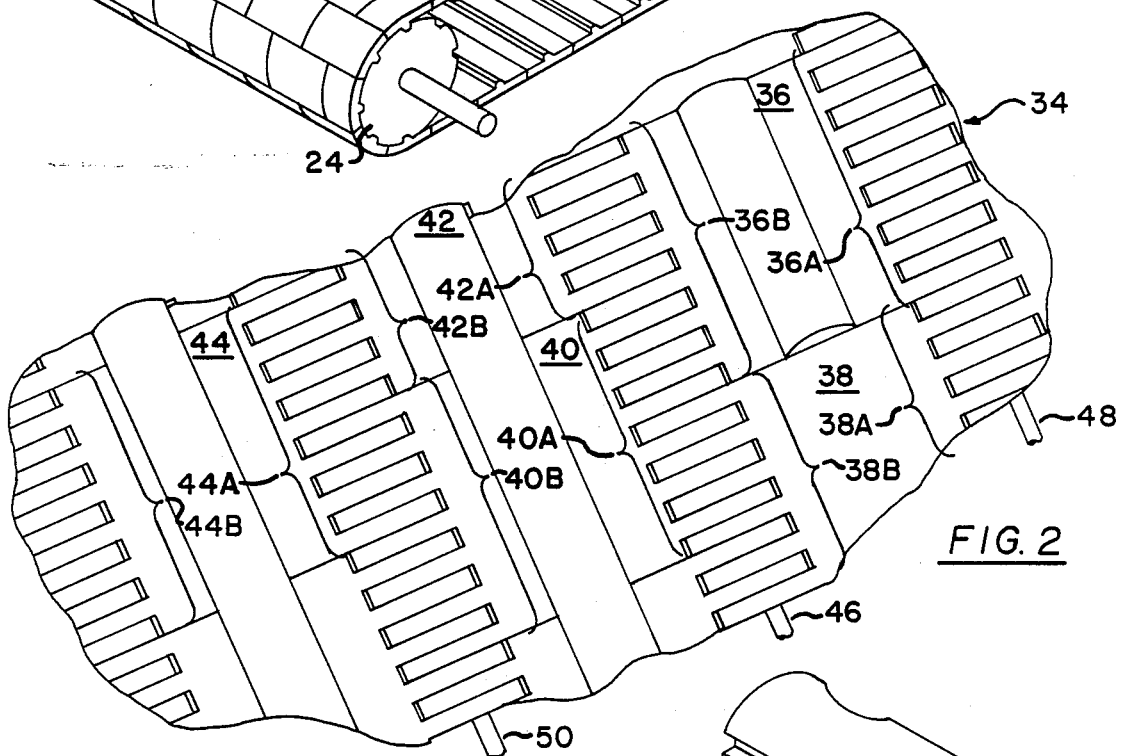
FIG. 2 shows a section of the conveyor belt of FIG. 1 and further illustrates a plurality of the modules making up the belt of FIG. 1 being pivotally connected.

As shown in FIG. 2, which is a blown up portion of a section 34 of the conveyor belt of FIG. 1, belt 22 is formed of a multiplicity of identical modules, such as modules 36, 38, 40, 42 and 44, each of which has a first plurality of pivot ends 36A, 38A, 40A, 42A and 44A, and a second plurality of pivot ends 36B, 38B, 40B, 42B, and 44B respectively. As can also be seen, modules 36 and 38 are arranged side-by-side such that the apertures defined in each of the plurality of pivot ends 36B and 38B are arranged coaxially. In a similar manner the modules 40 and 42 are also arranged side-by-side such that the pivot holes defined in the plurality of link ends 40A and 42A are also coaxial. The plurality of pivot ends 36B and 38B of their respective modules 36 and 38 are then intermeshed with the plurality of pivot ends 40A and 42A of modules 40 and 42 such that all of the pivot holes of the intermeshed link ends are coaxial and the modules are all pivotally connected by a single pivot rod 46. Thus it can be seen that the inclined conveyor belt of FIG. 1 is therefore formed of a large plurality of such modules arranged side-by-side and end-to-end and joined by a multiplicity of pivot rods such as 46, 48 and 50 so that the conveyor belt may be formed as an endless loop around sprockets 24 and 26.

Figures 3, 3A:
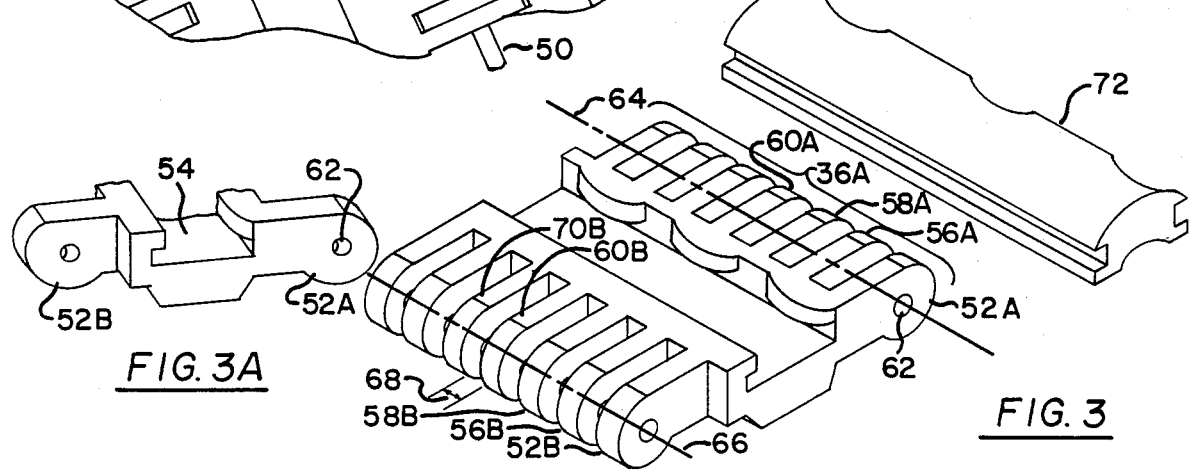
FIG. 3 is a perspective view of a single module of FIG. 2 wherein the first plurality of pivot ends are laterally offset from the second plurality of pivot ends.

Referring now to FIG. 3, there is shown a perspective view of one of the modules, such as module 36 making up the section of belt shown in FIG. 2, and the full conveyor belt shown in FIG. 1. As will be appreciated by those skilled in the art, such modules are preferably formed by injection molding of inherently slick or low friction material such as polypropylene, polyethylene, acetal and the like. As can be seen more clearly in the broken-out view of FIG. 3A, module 36 is formed of a plurality of elongated elements each of which has a first pivot end 52A and a second pivot end 52B joined by an intermediate section 54. In a similar manner, the plurality of pivot ends 36A of the module 36 is comprised of a plurality of parallel members such as shown at 52A, 56A, 58A and 60A, each of which member defines an aperture such as aperture 62 in link end 52A. And as can also be more clearly seen in this figure of a single link module, the pivot axis of the apertures such as aperture 62 defined in each of the parallel pivot ends of the pluralities of pivot ends 36A are all aligned coaxially along a pivot axis indicated by pivot line 64. In a similar manner, all of the pivot holes defined in the plurality of pivot ends 36B are aligned coaxially along a second pivot axis 66. Pivot apertures do not necessarily have to be circular in cross-sections but may be another suitable shape as required to permit cleaning, etc. However, a circular shape is shown in FIGS. 3 and 3A because circular shapes are the most easily manufactured. Pivot axes 64 and 66, as will be appreciated by those skilled in the art are parallel to each other and thereby define a common first plane.

As can also be clearly seen by FIGS. 3 and 3A, each of the plurality of link ends 36A and 36B respectively are joined by and formed integral with an intermediate section 54. Intermediate section 54, as can be seen, maintains each of the individual pivot ends of the plurality of pivot ends of 36A and 36B parallel to each other and at a selected spaced distance from each other. It will also be appreciated that since each of the pluralities of pivot ends must intermesh with the plurality of the pivot ends of another module, the individual pivot ends such as pivot ends 52A, 56A, 58A and 60A have a thickness which is less than the spacing between adjacent pivot ends such as the space indicated by arrow 68 between pivot end 70B and pivot end 60B.

Figure 4A:
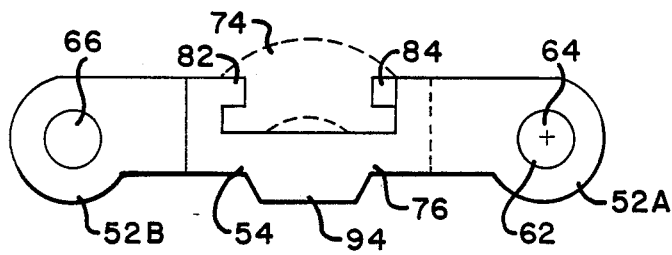
FIGS. 4A and 4B are side views of the module and frictional member respectively of FIG. 3.
Figure 4B:
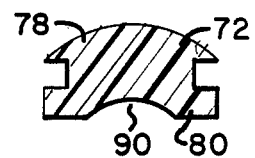
Figure 5A:
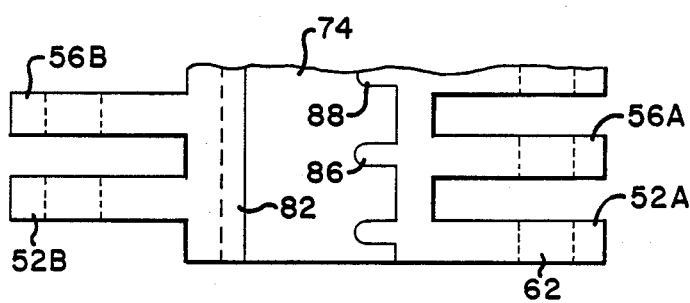
FIG. 5A and 5B are top views of the module and frictional member respectively of FIG. 3.
Figure 5B:
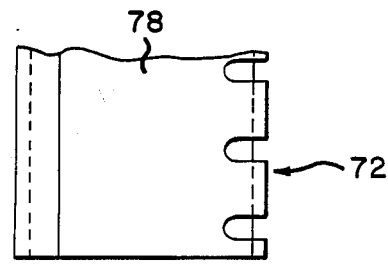
Figure 7:
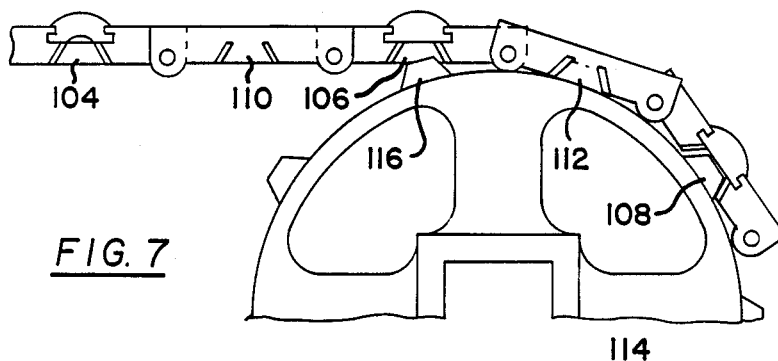
FIG. 7 discloses a belt similar to that of FIG. 4 except the method of driving is by means of a toothed sprocket wheel moving into recesses in individual modules.

Further, although different types of pivot ends and intermediate sections may be used in forming modules incorporating the teaching of this invention (as will be discussed in detail hereinafter), in a preferred embodiment, such as shown in FIGS. 3 and 3A, the first plurality of pivot ends 36A are laterally offset from the second plurality of link ends 36B such that each of the pivot ends of the first plurality 36A are in register with the spaces between the link ends of the second plurality of 36B and visa-versa. Offsetting the plurality of pivot ends 36A laterally from the pivot ends 36B as illustrated in FIG. 3 and 3A, allows the modules to be arranged end to end and still provide a substantially continuous outside edge. Referring now to FIG. 3, and FIGS. 4A and 4B which are side views of the module of FIG. 3, and FIGS. 5A and 5B which are top views of the module of FIG. 3, it can be seen that the frictional member 72 which is made out of a resilient material such as rubber, plastic, leather or the like, is formed suitable for locating within a recess 74 of the module 76 and includes a top surface 78 which protrudes above the top plane of the module 76 thereby providing a conveying surface which exhibits increased friction characteristics. As shown, the frictional member 72 includes a bottom portion or an attaching portion 80 which conforms to the recess 74 in module 36 and which is restrained within the recess 74 by means of an overhang such as ledge 82 shown on the left side of FIGS. 4A and 5A, or tabs 84, 86 and 88 which extend over the recess thereby maintaining resilient member 72 in position. As can best be seen in FIG. 4B, resilient frictional member 72 may also include a hollow or scalloped out area 90 which allows the member 72 to be deformed sufficiently to be inserted in the recess 74 and under the restraining ledge 82, and tabs 84, 86 and 88. This of course allows for easy insertion of the member. It will, of course, be appreciated that the resilient frictional member 72 may be of a length substantially the same as that of the width of the module 36 such that a resilient member may be inserted in each module making up a belt such as shown in FIG. 3. Alternately, and as shown in FIG. 2, a single resilient member 92 may have a length equal to a plurality of the widths of modules such as modules 40 and 42, and extend across two or more such modules as shown when the modules are arranged in a side-by-side relation. To fabricate such a belt, it will be appreciated of course that the side-by-side link modules should first be pivotally connected and then the resilient member 72 inserted into the recess 74. It will further be appreciated that although the conveyor belt as illustrated in FIGS. 1 and 2 was fabricated wholly out of the high friction conveying surface modules of this invention, it should be understood that as shown in FIG. 7, a satisfactory high friction belt may be fabricated partially of the high friction conveying surface modules of this invention, such as modules 104, 106 and 108, and partially of similar constructed modules, but which do not include the resilient high friction frictional member such as modules 110 and 112.

Figure 4C:
FIGS. 4C, 4D and 4E are side views of frictional members similar to the frictional member of FIG. 4B, except they have different cross-sections.
Figure 4D:
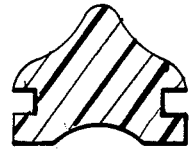
Figure 4E:
Figure 6:
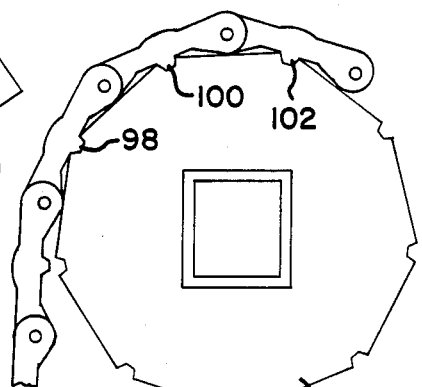
FIG. 6 illustrates a side view of the belt of FIG. 1 formed of modules of FIGS. 3, 4A and 4B as the belt travels around a sprocket.

In the embodiment of FIG. 4A, there is also shown a tooth member 94 extending from the intermediate section 54 and substantially equal distance between to the two pivot axes 64 and 66. As can be seen in FIG. 6, the plurality of modules of a type shown in FIG. 4A are driven by a sprocket wheel 96 which has cooperating recesses 98, 100 and 102 which receive a tooth similar to tooth 94 of FIG. 4A, and similar teeth on other modules, such that the modules receive thereby a driving force which is orthogonal to the axes 64 and 66 and which at the same time is substantially parallel to the plane defined by the axes 64 and 66. It will, of course, be appreciated that as shown in FIGS. 4C, 4D and 4E, the cross-section of the frictional member may have any suitable shape for providing a non-slip surface.

It will be appreciated of course that as discussed in the background of this application there are now various types of modular link belts being manufactured. Therefore, there is shown in FIG. 7 a side view of another type module which incorporates the frictional member of this invention, but which receives its driving force in a different manner. As shown, rather than using a driving tooth on each module each module instead defines a recess such as recesses 104, 106, 108, 110 and 112 suitable for receiving a tooth protruding from the circumference of a drive sprocket wheel 114. For example, recess 106 is shown as receiving tooth 116.

Figure 8:
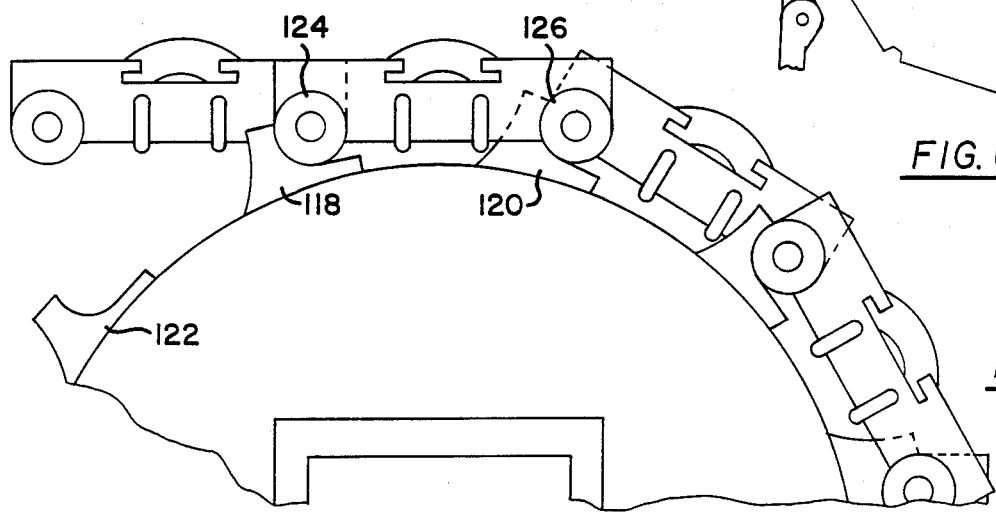
FIG. 8 illustrates a side view of still another type of module wherein the driving is accomplished by means of a toothed sprocket wheel engaging the link ends of each module.
Figure 9:
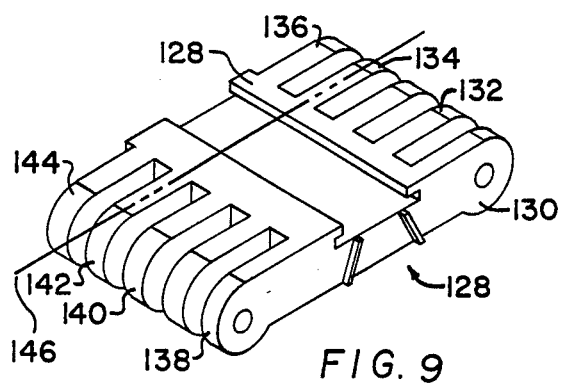
FIG. 9 shows a top view of the module of FIG. 7 having the first plurality of pivot ends in line with the second plurality of pivot ends, and including recesses for receiving the projections of a toothed sprocket wheel.
Figure 10:
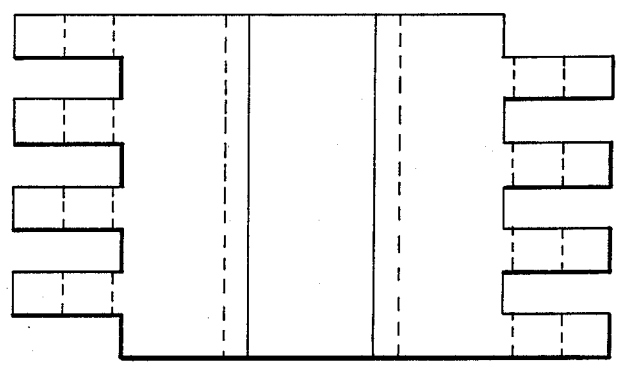
FIG. 10 shows a top view of a module similar to the module of FIG. 9, except the first plurality of ends are laterally offset from the second plurality of pivot ends.
Figure 11:
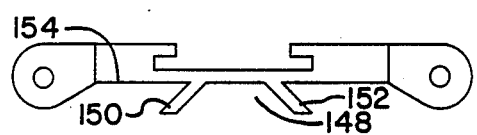
FIG. 11 shows one embodiment of a side view and bottom view of a module having a top view similar to that of FIG. 10.
Figure 11:
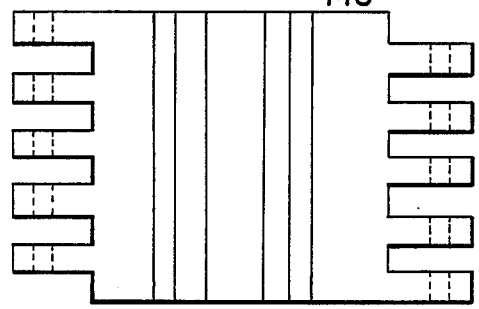
Figure 12:
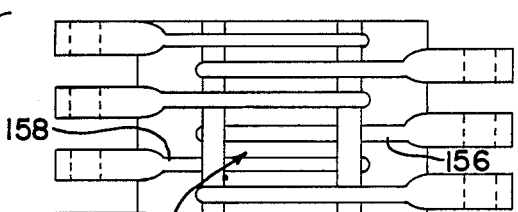
FIG. 12 shows both a side and bottom view of still another alternate embodiment having a top view similar to that of FIG. 10.
Figure 13:
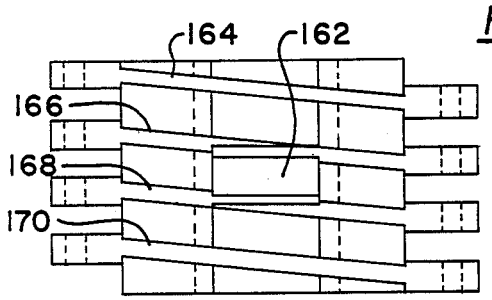
FIG. 13 shows still another top and bottom view of another alternate embodiment having a top similar to that of FIG. 10.
Figure 13:
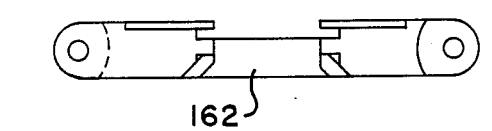

In a similar manner, FIG. 8 shows still another type module of a link belt wherein contoured teeth 118 and 120 extending from the circumference of another drive sprocket 122 engage and contact surfaces 124 and 126 on the link or pivot end rather than at an intermediate recess. Thus, it will be appreciated that the teachings of this invention may be incorporated with link belts which may be different in appearance, and may use substantially any type of driving means. As an example, FIG. 9 illustrates a single module 128 comprised of members 130, 132, 134 and 136 and which is of the type shown in FIG. 7 without the resilient frictional member being inserted. In this module 128, it can be seen that the first plurality of pivot ends on one side of the module are in line with pivot ends 138, 140, 142 and 144 on the other side as is illustrated by straight line 146 which extends through pivot ends 134 and 142. This in line arrangement would also apply to modules of a belt similar to that shown in FIG. 8. As a further example, FIG. 10 shows a top view of a module wherein the pivot ends are laterally offset. Several types of module construction may present a top view similar to that shown in FIG. 10. As can be seen from the bottom and side view of FIG. 11, a sprocket tooth of a sprocket wheel engages a pocket 148 formed by orthogonally extending angled member 150 and 152 protruding from the underside portion 154 of the module rather than a recess actually formed in the module. Likewise, as shown in the side and bottom views of FIGS. 12, the plurality of alternating elongated members such as members 156 and 158 may include partially void areas such as 160 which form the recess for receiving the tooth of a drive sprocket. In a similar manner, the side and bottom views of FIG. 13 show how a recess 162 may be formed even though the elongated members include angled members 164, 166, 168 and 170 to achieve the lateral offset of the two pluralities of pivot ends.

Figure 14:
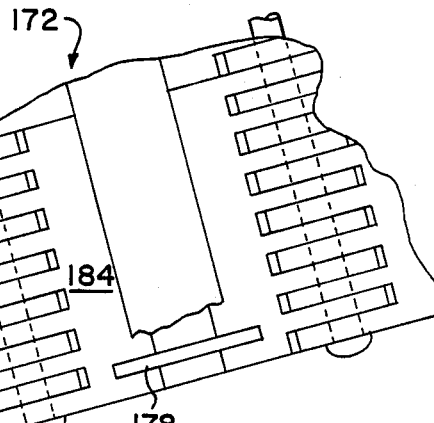
FIG. 14 shows a conveyor belt section having a conductive material imbedded in the outside modules of a belt which serve as the armature of a linear motor having electrical coils which serve as a stator for interacting with and moving said armature.

It is also clear, as shown in the perspective side and end views the belt 172 of FIGS. 14, 15 and 16 respectively, that it is not necessary that a drive sprocket be used at all. According to the FIGS. 14, 15 and 16, an electric conductive material 174, 176 and 178 is secured to selected modules such as modules 180, 182 and 184 located at the outside edge of belt 172 which is comprised of a plurality of otherwise similar modules. Although the conductive material may be secured by any means to the selected modules, it will be appreciated that in a preferred operation the conductive material may preferably be imbedded in the end portions of the selected modules which will ultimately form the edges of the assembled belt during the injection molding process. A plurality of these modules having the conductive material imbedded therein are then arranged end-to-end on both edges of the belt such that they are in alignment with each other. Further as is shown in FIGS. 15 and 16, one or more C-shaped coils 186, 188 and 190 are arranged such that the opening 192 of the C-shaped coil passes over the aligned magnetic members on side 194 of belt 172. In a similar manner, another series of C-shaped coils (such as coil 196) are arranged so that the conductive materials on side 198 pass between the C-shaped openings 200 of their respective coils. Thus in this manner, the conductive members in the belt act as the armature of a linear motor and electrically interact with the coils which are sequentially electrically activated to move the belt in a direction orthogonal to the pivot axis and substantially parallel to the plane defined by the pivot axis. Thus, as discussed above it can be seen that modular conveying belts using any type of driving force for imparting motion to the conveyor belt may incorporate the teachings of this invention.

As discussed heretofore, a single frictional member having a top conveying surface has been combined with a module to form a conveyor belt having a non-slipping surface. However, as shown in FIG. 17, a typical module similar to that discussed with respect to FIG. 4A may instead define a pair of recesses 202 and 204 each of which receives a resilient member 206 and 208 respectively which are similar to the resilient members discussed above. It will also be appreciated of course that even additional recesses could be included and three or more resilient members inserted in such recesses.

Further, although to this point the resilient conveying members have been described as being secured to each individual module by being inserted in recesses and retained by overhangs such as ledges or tabs, it will be appreciated of course that other methods of attaching the resilient member may be used. For example, FIG. 18A shows how resilient member 210 may be attached to module 212 by means of brads or rivets 214 and 216. In a similar manner, and as shown in FIG. 18B resilient member 218 may be attached to module 220 by a screw member 222. Other techniques may simply include the use of an adhesive 224 located between the resilient member 226 and the module 228 as illustrated in FIG. 18C.

A still further method of attaching as shown in FIG. 18D, would be to simply mold integrally with the frictional member 230 elastic fastening snaps 232 and 234, which could be inserted through properly aligned holes in the module 236. These elastic snaps would obviate the need for any undercuts in the plastic module and for separate fastening devices such as screws, rivets and adhesives. As an alternate method to the previously described methods of attaching (wherein a recess was typically used) FIGS. 19A and 19B show yet another method of attaching the resilient frictional member to the module. As shown in these figures, the conveying module 238 defines a top surface 240 which includes protrusions 242 and 244. The resilient frictional member 246 is permanently and securely bonded to a deformable member 248, such as for example a strip of soft iron. The combination soft iron member 248 and resilient frictional member 246 is then attached to the top surface 240 by crimping the edges 250 and 252 of the soft metal strip 248 around protrusions 242 and 244. Thus, it will be appreciated that the teachings of this invention are intended to include all methods of attaching one or more resilient conveying members to a module, and it should be appreciated that the techniques discussed herein are examples only.

Further, as shown in FIGS. 20A and 20B instead of one or more resilient frictional members which run parallel to the pivot axis being included with a single module, a module such as module 254 may include a plurality of smaller resilient members such as conveying members 256, 258 and 260 which run perpendicular to the pivot axis. It will be appreciated of course that these resilient members 256, 258 and 260 may be attached to the top surface 262 of module 254 by any of the techniques discussed heretofore or any other suitable technique.

Thus, although there has been described to this point particular embodiments of modules for forming conveyor belts having a high friction frictional surface, it is not intended that such specific references be considered as limitations upon the scope of this invention except insofar as set forth in the following claims.

I claim:

1. A pivotally linked conveyor belt comprising a plurality of similar modules having first and second pluralities of pivot ends adapted to be pivotally connected end-to-end and side-by-side, said first plurality of pivot ends located a selected pitch dimension from said second plurality of pivot ends and further joined and maintained parallel to said second plurality of pivot ends by an intermediate section, said modules being integrally molded from a low friction inherently slick plastic material, said intermediate section of selected ones of said modules defining a recess and an overhang extending over said recess on the upper side of the module for removably receiving a frictional member made of a resilient materials, said member having a dimension extending between said first and second pluralities which is fully within said intermediate section, the fictional characteristics of said resilient material being substantially greater than said inherently slick plastic material so that the belt has a low friction on its bottom side and a higher friction on the upper side of said selected modules.

2. A module having a high friction conveying surface for use in a modular conveyor belt, said belt comprised at least in part of a plurality of modules having such a high friction conveying surface, each module of said conveyor belt having the same pitch dimensions, being adapted to be connected end-to-end and side-by-side and being integrally molded from a low friction inherently slick plastic material, and each of said plurality of modules having said high friction surface comprising:

a first and second plurality of integrally molded pivot ends joined by and formed integral with an intermediate section, said intermediate section defining a recess and an overhang extending over said recess on the top portion of said intermediate section, and said first plurality of pivot ends connected parallel to and at a spaced distance from each other so as to define a first pivot axis, and said second plurality of pivot ends connected parallel to and at a spaced distance from each other so as to define a second pivot axis such that said conveyor belt-modules may be pivotally connected end-to-end and side-by-side;

means integrally formed with said modules for receiving a driving force which includes a vector which is orthogonal to said first and second pivot as, and also substantially parallel to a first plane common to said pivot axis to move said module in a direction perpendicular to said pivot axis; and each of said high friction conveying surface modules further comprising a frictional and resilient member removably received in said recess on the top portion of said intermediate section and retained in said recess by said overhand, said fictional member exhibiting increased friction characteristics above the bottom portion of said intermediate section molded from said inherently slick plastic material to reduce slippage between a conveyor belt comprised at least in part of such modules and items being conveyed by said conveyor belt, said frictional member having a dimension extending between said first and second pluralities which is fully within said intermediate section.

3. A module having a high friction conveying surface for use in a modular conveyor belt, said belt comprised at least in part of a plurality of modules having such a high friction conveying surface, each module of said conveyor belt having identical pitch dimensions, being adapted to be connected end-to-end and side-by-side and being integrally molded from a low friction inherently lock plastic material, and each of said plurality of modules having a high friction surface comprising:

a first and second plurality of integrally molded pivot ends joined by and formed integral with an intermediate section, each of said first and second pluralities of pivot ends defining a pivot axis, said first plurality of pivot ends connected parallel to and at spaced distances from each other said second plurality of pivot ends connected parallel to and at spaced distances from each other, said pivot axis of said first and second pluralities separated by said pitch dimension, the length of the module being equal to the length of the intermediate section plus a first and second pivot end, and the width of the module being determined by the number of connected pivot ends;

said pivot axis of said first and second pluralities lying in a common first plane, the thickness of said first and second pluralities of pivot ends and the spacing between pivot ends cooperating such that said first and second pluralities of pivot ends of a module are suitable for intermeshing with first and second pluralities of pivot ends of another module so that the pivot axis of the pivot ends of such intermeshed modules are also coaxial and suitable for being pivotally connected end-to-end and side-by-side;

means integrally formed with said module for receiving a driving force by said modules which includes a vector which is orthogonal to said pivot axis ad substantially parallel to said common first plane to move said modules in a direction perpendicular to said pivot axis; and each of said high friction conveying surface modules further defining a recess for removably attaching a fictional member on said top portion of said intermediate section, and further comprising, a frictional and resilient member having an attaching portion for cooperating with said recess on said top portion of said intermediate section and having a dimension extending between said first and second pluralities which is fully within said intermediate section for providing a conveying surface exhibiting increased friction characteristics from said inherently slick plastic material; and an overhang extending over said recess for retaining said frictional and resilient member in said recess to reduce slipping between a conveying belt comprised at least in part of such high friction modules and items being conveyed by said modular conveying belt.

4. A pivotally linked conveyor belt comprising a plurality of similar modules having first and second pluralities of pivot ends adapted to be pivotally connected end-to-end and side-by-side, said first plurality of pivot ends located a selected pitch dimension from said second plurality of pivot ends and further joined and maintained parallel to said second plurality of pivot ends by an intermediate section, said modules being integrally molded from a low friction inherently slick plastic material, said intermediate section of selected ones of said modules defining a recess and an overhang extending over said recess on the upper side of the module for receiving a frictional member made of a resilient material, said member having a dimension extending between said first and second pluralities which is less than said pitch dimension, the frictional characteristics of said resilient material being substantially greater than said inherently slick plastic material so that he belt has a low friction on its bottom side and a higher friction on the upper side of said selected modules.

5. A module having a high friction conveying surface for use in a modular conveyor belt, said belt comprised at least in part of a plurality of modules having such a high friction conveying surface, each module of said conveyor belt having the same pitch dimension, being adapted to be connected end-to-end and side-by-side and being integrally molded from a low friction inherently slick plastic material, and each of said plurality of modules having said high friction surface comprising:

a first and second plurality of integrally molded pivot ends joined by and formed integral with an intermediate section, said intermediate section defining a recess and an overhang extending over said recess on the top portion of said intermediate section, and said first plurality of pivot ends connected parallel to and at a spaced distance from each other so as to define a first pivot axis, and said second plurality of pivot ends connected parallel to and at a spaced distance from each other so as to define a second pivot axis such that said conveyor belt modules may be pivotally connected end-to-end and side-by-side;

means integrally formed with said modules for receiving a driving force which includes a vector which is orthogonal to said first and second pivot axis, and also substantially parallel to a first plane common to said pivot axis to move said module in a direction perpendicular to said pivot axis; and each of said high friction conveying surface modules further comprising a frictional and resilient member received in said recess on the top portion of said intermediate section and retained in said recess by said overhang, said frictional member exhibiting increased friction characteristics above the bottom portion of said intermediate section molded from said inherently slick plastic material to reduce slippage between a conveyor belt comprised at least in part of such modules and items being conveyed by said conveyor belt, said frictional member having a dimension extending between said first and second pluralities which is less than said pitch dimension.

6. A module having a high friction conveying surface for use in a modular conveyor belt, said belt comprised at least in part of a plurality of modules having such a high friction conveying surface, each module of said conveyor belt having an identical pitch dimension, being adapted to be connected end-to-end and side-by-side, being integrally molded from a low friction inherently slick plastic material, and each of said plurality of modules having a high friction surface comprising:

a first and second plurality of integrally molded pivot ends joined by and formed integral with an intermediate section, each of said first and second pluralities of pivot ends defining a pivot axis, said first plurality of pivot ends connected parallel to and at spaced distances from each other said second plurality of pivot ends connected parallel to and at spaced distances from each other, said pivot axis of said first and second pluralities separated by said pitch dimension, the length of the module being equal to the length of the intermediate section plus a first and second pivot end, and the width of themodule being determined by the number of connected pivot ends;

said pivot axis of said first and second pluralities lying in a common first plane, the thickness of said first and second pluralities of pivot ends and the spacing between pivot ends cooperating such that said first and second pluralities of pivot ends of a module are suitable for intermeshing with first and second pluralities of pivot ends of another module so that the pivot axis of the pivot ends of such intermeshed modules are also coaxial and suitable for being pivotally connected end-to-end and side-by-side;

means integrally formed with said module for receiving a driving force by said modules which includes a vector which is orthogonal to said pivot axis and substantially parallel to said common first plane to move said modules in a direction perpendicular to said pivot axis; and each of said high friction conveying surface modules further defining a recess for attaching a frictional member on said top portion of said intermediate section, and further comprising, a frictional and resilient member having an attaching portion for cooperating with said recess on said top portion of said intermediate section and having a dimension extending between said first and second pluralities which is less than said pitch dimension for providing a conveying surface exhibiting increased friction characteristics from said inherently slick plastic material; and an overhang extending over a portion of said recess for retaining said frictional and resilient member in said recess to reduce slipping between a conveying belt comprised at least in part of such high friction modules and items being conveyed by said modular conveying belt.

7. The module of claims 2, 3, 5 or 6 wherein said resilient member is made of a flexible material selected from the group consisting of rubber, plastic and leather.

8. The module of claim 3 or 6 wherein said first plurality of link ends of a module are laterly offset from said second plurality link ends such that each link end of said first plurality are in register with the spaces between the link ends of said second plurality and said link ends of said second plurality are in register with the spaces between the link ends of said first plurality.

9. The linked belt of claim 1 or 4 and further comprising means for receiving a driving force to move said belt along a selected direction of travel.

10. The invention of claims 2, 3 or 9 wherein said means for receiving a driving force is a tooth extending from said bottom portion of said belt modules for engaging a cooperating recess in a drive sprocket.

11. The module of claims 2, 3, 9, 5 or 6 wherein said means for applying a driving force is a recess defined in said bottom side of said module for receiving a cooperating tooth extending from said sprocket.

12. The modules of claims 2, 3, 5 or 6 wherein said means for receiving a driving force is a contact area on selected ones of said pivot ends for engaging a cooperating tooth shaped to conform with said pivot ends and extending from said drive sprocket.

13. The module of claim 8 wherein said means for receiving a driving force is a tooth extending from said bottom portion of said module for engaging a cooperating recess in said drive sprocket.

14. The module of claim 8 wherein said means for receiving a driving force is a recess defined in said bottom portion of said module for engaging a cooperating tooth extending from said sprocket.

15. The module of claim 8 wherein said means for applying a driving force sprocket is a contact area on selected ones of said link ends for receiving a cooperating tooth extending from said drive sprocket.

16. The modules of claims 2, 3, 5 or 6 comprising a linked belt, each of said modules, including said high friction conveying surface modules, positioned with respect to another one of said modules such that one of said first and second pluralities of pivot ends of each module is intermeshed with one of said first and second pluralities of pivot ends of another one of said modules; and further comprising a plurality of pivot rods for pivotally joining said modules to form said linked belt.

17. The linked belt of claim 16 wherein said modules are further arranged in a side-by-side relationship with other ones of said modules such that the pivot axis defined by said first plurality of pivot ends and second plurality of pivot ends respectively are coaxial with respect to adjacent side-by-side modules.

18. The linked belt of claim 16 wherein said first and second pluralities of pivot ends are pivotally joined to form an endless loop.

19. The linked belt of claim 16 wherein said means for receiving a driving force further includes a conductive material secured to selected elongated elements located at the outside edge of selected ones of said plurality of modules, and a plurality of electrical coils positioned to electrically interact with said conductive material of said selected elongated elements such that said selected elongated elements and said electrical coils operate as the armature and drive coils respectively of a linear motor so that sequentially energizing said electrical coils generate a moving field which interacts with said conductive material to provide said driving force.

20. The linked belt of claim 9 wherein said means for receiving a driving force further includes a conductive material secured to outside edges of selected modules, and a plurality of electrical coils positioned to electrically interact with said conductive material such that said selected modules and said electrical coils operate as the armature and drive coils respectively of a linear motor so that sequentially energizing said electrical coils generate a moving field which interacts with said conductive material to provide said driving force.

21. The apparatus of claim 16 wherein said linked belt consists essentially of modules having said high friction conveying surfaces.

22. The apparatus of claim 17 wherein said linked belt consists essentially of modules having said high friction conveying surfaces.

23. The apparatus of claim 18 wherein said linked belt consists essentially of modules having said high friction conveying surfaces.

24. The linked belt of claim 9 wherein said means for receiving a driving force is integrally formed with said module.

25. The invention of claims 2, 3, 9, 5 or 6 wherein said means for receiving a driving force comprises a plurality of means on a single module.

* * * * *